United States Patent
Yagihashi (10) Patent No.: US 7,376,422 B2
(45) Date of Patent: May 20, 2008

(54) MOBILE COMMUNICATION SYSTEM UTILIZING ADVANCE NOTICE OF DATA TRANSMISSION

(75) Inventor: Ayumu Yagihashi, Tokyo (JP)

(73) Assignee: NEC Corporation, Tokyo (JP)

( * ) Notice: Subject to any disclaimer, the term of this patent is extended or adjusted under 35 U.S.C. 154(b) by 331 days.

(21) Appl. No.: 11/008,176

(22) Filed: Dec. 10, 2004

(65) Prior Publication Data

US 2005/0128973 A1 Jun. 16, 2005

(30) Foreign Application Priority Data

Dec. 11, 2003 (JP) ............... 2003-413697

(51) Int. Cl.
*H04Q 7/20* (2006.01)
(52) U.S. Cl. .............. 455/434; 455/561; 370/335; 370/342
(58) Field of Classification Search .......... 370/209, 370/335, 342; 455/434, 561
See application file for complete search history.

(56) References Cited

U.S. PATENT DOCUMENTS

| 2002/0187786 | A1 | 12/2002 | Takano et al. |
| 2003/0002472 | A1 | 1/2003 | Choi et al. |
| 2003/0073409 | A1 | 4/2003 | Nobukiyo et al. |
| 2003/0095532 | A1* | 5/2003 | Kim et al. .............. 370/342 |
| 2003/0210668 | A1* | 11/2003 | Malladi et al. .............. 370/335 |

FOREIGN PATENT DOCUMENTS

| CN | 1395386 A | 2/2003 |
| EP | 1 414 201 A1 | 4/2004 |
| JP | 2002-369235 | 12/2002 |
| JP | 2003-199173 | 7/2003 |
| WO | WO 02/15420 A2 | 2/2002 |

OTHER PUBLICATIONS

"Universal Mobile Telecommunications System (UMTS); Requirements for Support of Radio Resource Management (FDD) (3Gpp TS 25.133 version 4.1.0 Release 4); ETSI TS 125 133" vol. 3-R4, No. V410, 2001 (XP014008230).

(Continued)

*Primary Examiner*—Philip J. Sobutka
(74) *Attorney, Agent, or Firm*—Foley & Lardner LLP (57) ABSTRACT

A mobile communication system, base station device, and mobile wireless terminal are provide which are capable of improving throughput and/or communication quality in the mobile wireless terminal when an HSDPA (High Speed Downlink Packet Access) method is applied to W-CDMA (Wideband Code Division Multiple Access) communication. A base station device transmits an empty pattern of a channelization code set for an HS-SCCH (High Speed Shared Control CHannel), which is used as an advance notice of transmission for a downlink employed in the HSDPA method, to the mobile wireless terminal. The mobile wireless terminal, when having received the advance notice of transmission for the downlink employed in the HSDPA method from the base station device, adds assumed power for transmission of the HS-DPCCH (High Speed Dedicated Physical Control CHannal) data to the estimated transmission power value to be used for judgement as to whether a TFC (Transport Format Combination) of a DPCH (Dedicated Physical CHannel) is usable or not.

18 Claims, 9 Drawing Sheets

OTHER PUBLICATIONS

Nokia: "R4-031037 PAR increase of UE transmitting signal with HS-DPCCH" TSG-RAN Working Group 4 Radio Meeting No. 29, Nov. 2003, URL:http://www.3gpp.org/ftp/tsg_ran/WG4_ Radio/TSGR4_ 29/Docs (XP002321760).

Nokia: "R4-021607 UE maximum output power with HS-DPCCH" TSG-RAN Working Group Radio Meeting No. 25, Nov. 2002, URL:http://www.3gpp.org/ftp/tsg_ ran/WG4_ Radio/TSGR4_ 25/Docs/R4-021697.zip> (XP002321761).

* cited by examiner

MOBILE COMMUNICATION SYSTEM UTILIZING ADVANCE NOTICE OF DATA TRANSMISSION

BACKGROUND OF THE INVENTION

1. Field of the Invention

The present invention relates to a mobile communication system, and a base station device and a mobile wireless terminal used in the same system, and more particularly to the mobile communication system, the base station device, and the mobile wireless terminal which make data transmission by using an HSDPA (High Speed Downlink Packet Access) method.

The present application claims priority of Japanese Patent Application No. 2003-413697 filed on Dec. 11, 2003, which is hereby incorporated by reference.

2. Description of the Related Art

In a W-CDMA (Wideband Code Division Multiple Access) communication system in conformity with 3GPP (3rd Generation Partnership Project) being now standardized, the HSDPA is proposed as technology that can realize a high-speed downlink.

In the HSDPA method, as a physical channel for a downlink through which data are transmitted from a base station to a mobile wireless terminal, an HS-SCCH (High Speed—Shared Control CHannel) and an HS-PDSCH (High Speed-Physical Downlink Shared CHannel) are additionally provided. The HS-SCCH is used to transmit control information of the HS-PDSCH pairing up with the HS-SCCH, while the HS-PDSCH is used to transmit packet data employed in the HSDPA method. Moreover, the HS-PDSCH can use a maximum 15 pieces of channelization codes in units of subframes, which is called a multi-code, and the number of used multicodes is called the multicode number. The subframe denotes a frame length of a physical channel used in the HSDPA method expressed in time units of three slots and a slot denotes a time unit designated by the 3GPP.

Figure 9:
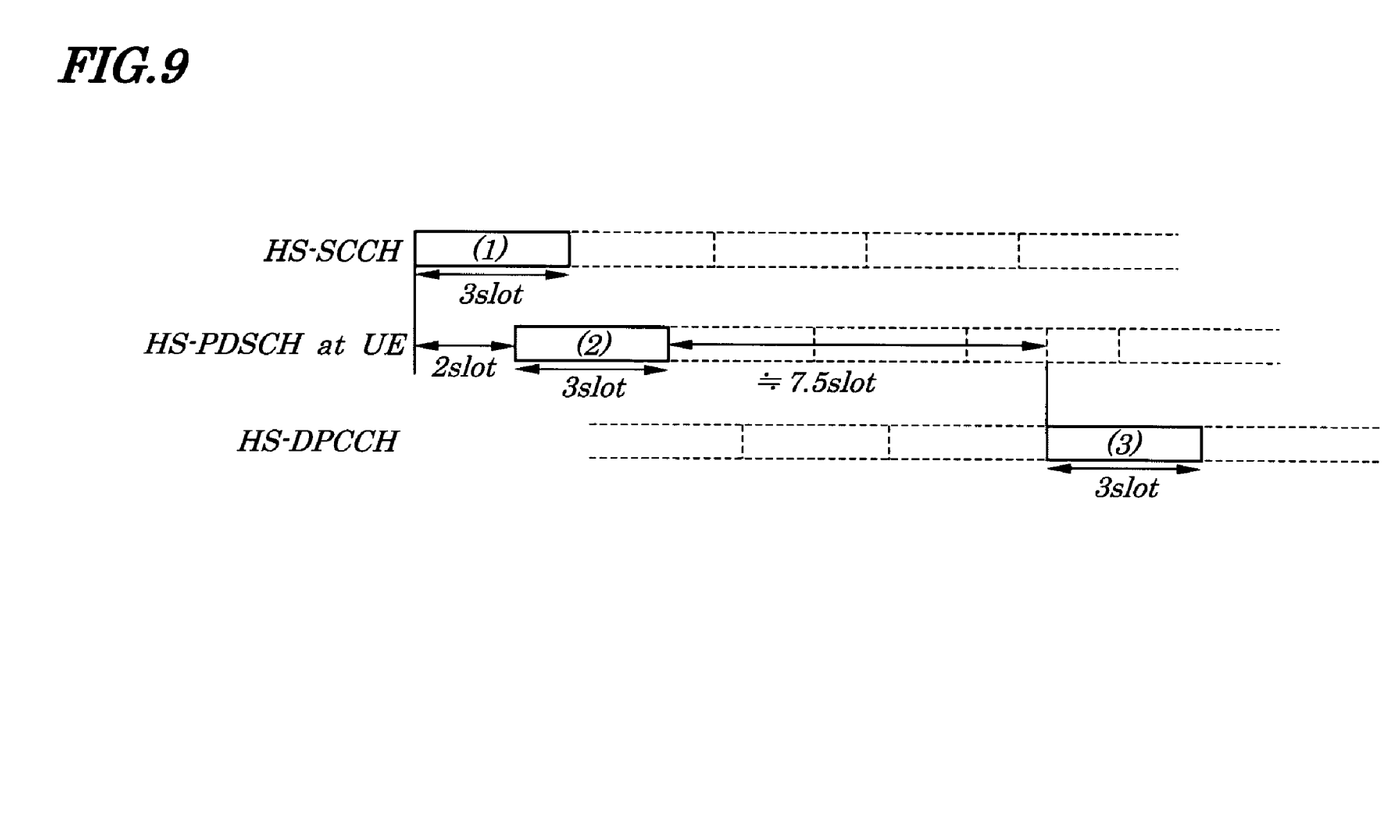
FIG. 9 is a diagram showing timing of transmitting and receiving data in the mobile wireless terminal according to the embodiment of the present invention, as well as a conventional mobile wireless terminal.

On the other hand, as a physical channel for an uplink through which the mobile wireless terminal transmits packet data to the base station, an HS-DPCCH (High Speed-Dedicated Physical Control CHannel) is additionally provided. In the communication using the HSDPA method, two channels including the HS-DPCCH and a DPCH (Dedicated Physical CHannel) are used when packet data is transmitted from the mobile wireless terminal to the base station. The HS-DPCCH informs the base station of whether or not packet data transmitted through the HS-PDSCH pairing up with the HS-DPCCH has been received by the mobile wireless terminal, or of a state of a transmission path. FIG. 9 shows a time relationship of data transmission among the HS-SCCH, HS-PDSCH, and HS-DPCCH.

In the present W-CDMA communication system, whether each TFC (Transport Format Combination) of an uplink DPCH is usable or not is determined by using information about a past estimated transmission power value of the mobile wireless terminal. One of standards for determining the use of a given TFC is whether or not the TFC is one that was allowed to be used based on the past estimated transmission power value of the mobile wireless terminal. Here, the TFC denotes a plural transport channel combining pattern of a TF (Transport Format) showing an information size of each transport channel. Moreover, the estimated transmission power value represents a power value assumed as necessary for the mobile wireless terminal to transmit data to the base station. The reason why the use of the TFC of the DPCH is determined by using an estimated transmission power value is that, in general, power to be supplied has to be increased in proportion to an information size of data to be transmitted. Therefore, in a case where the past estimated transmission value frequently exceeds maximum transmission power, processing is performed in which power to be supplied is reduced by decreasing a size of information to be transmitted through an uplink DPCH.

According to 3GPP TS25.321 v5.5.0 or TS25.133 v5.7.0 in which specifications and procedures of the 3GPP are specified, whether or not each TFC of the uplink DPCH is usable is determined by using an estimated transmission value of the mobile wireless terminal during a specified period and it takes several tens of milliseconds or more before data reflecting this decision are actually transmitted.

As one of technologies using such the HSDPA method as above, a mobile communication system, base station, packet transmitting timing controlling method and program for the same are disclosed in Japanese Patent Application Laid-open No. 2002-369235. In the technology disclosed in the Japanese Patent Application Laid-open No. 2002-369235, the base station, when receiving data to be transmitted to a mobile station from a base station control device, feeds an advance notice (notification of transmitting timing) of data transmission to the mobile station. The mobile station, when receiving the advance notice of data transmission, notifies another base station being in a state of soft handover of timing of the data transmission. This prevents the above other base station from transmitting HS-PDSCH data to other mobile stations.

Also, a mobile communication system, communication control method, base station to be used for the above, and mobile station are disclosed in Japanese Patent Application Laid-open No. 2003-199173 in which, the base station, when receiving data to be transmitted to the mobile station, feeds an advance notice of data transmission to the mobile station by using a downlink DPCH. The mobile station, when receiving the above advance notice from the base station, transmits information about transmission quality to the base station.

As described above, in the communication using the HSDPA method, the HS-DPCCH is added to an uplink physical channel. In a case where an estimated transmission power value exceeds an allowable maximum transmission power value due to this addition of the HS-DPCCH, in an actual transmission, control is exercised so that power being assigned to both the HS-DPCCH and uplink DPCH is reduced so that the expected transmission power value does not exceed the maximum transmission power finally. As a result, it is predicted that, since power to be assigned to the uplink DPCH becomes small, a possibility that the TFC of the DPCH being unusable increases.

However, conventionally, it is impossible to judge whether the expected transmission power value exceeds the maximum transmission power due to the addition of the HS-DPCCH unless packet data was actually transmitted, by using the HS-DPCCH, from the mobile wireless terminal. Furthermore, in the conventional technology, even if the TFC of the uplink DPCH is judged to be unusable according to the above judging method, it takes several tens of milliseconds or more before data having reflected the judgement result are actually transmitted and, therefore, whether the TFC is usable or unusable cannot be immediately reflected in the DPCH. There is a high possibility that packet data transmitted through the HS-PDSCH of the downlink employed in the HSDPA method has occurred in a manner of a burst during a period in which the TFC cannot be made unusable, and a possibility increases that, in the uplink, data is frequently transmitted through the HS-DPCCH due to occurrence of the packet data transmitted through the HS-PDSCH. That is, at the time of transmission of data using the HS-DPCCH in which reduction of the power to be assigned to the uplink DPCH is required, there is a risk that an operation is performed with the power to be assigned to the DPCH being not reduced. This operation leads to a failure in the detection of transmitted data by the uplink DPCH at the base station, since, for a period of time of several tens of milliseconds or more to be taken after transmission of data to be transmitted through the uplink HS-DPCCH in response to data transmitted through the downlink HS-PDSCH through which a head of packet data is transmitted in the burst manner has been started before information that the TFC of the downlink HS-PDSCH cannot be used is actually reflected on the uplink PDCH, power being smaller than expected is assigned to both the uplink DPCH and the downlink HS-DPCCH.

There is a possibility that the conventional technology presents a problem in that the failure in the detection of transmitted data through the uplink DPCH causes a decrease in the communication quality and the failure in the detection of tranmitted data through the HS-DPCCH causes re-transmission of data through downlink HS-PDSCH pairing with the uplink DPCH which leads to a remarkable decrease in throughput of the downlink.

Thus, when the HSDPA method is applied to the conventional W-CDMA communication system constructed in conformity with the 3GPP, there may be a case in which the estimated transmission power exceeds the allowable maximum transmission power due to the addition of the HS-DPCCH and, therefore, the number of TFCs of the uplink DPCH that becomes unusable increases. However, the above conventional technology has the following problem, that is, since it took several tens of milliseconds or more before the information that the TFC of the downlink HS-PDSCH cannot be used is actually reflected on the uplink DPCH after transmission of data to be transmitted through the uplink HS-DPCCH in response to the data transmitted through the downlink HS-PDSCH through which a head of packet data has been transmitted in the burst manner has been started, it causes decreases in throughput of the downlink and in communication quality of the uplink.

Moreover, since, in the technology disclosed in the Japanese Patent Application Laid-open No. 2002-369235 and Japanese Patent Application Laid-open No. 2003-199173, configurations and functions to suppress a decrease in the communication quality caused by a shortage of power to be assigned for data transmission by such the HS-DPCCH as above are not provided and, as a result, it is difficult to solve the above problems.

SUMMARY OF THE INVENTION

In view of the above, it is an object of the present invention to provide a mobile communication system, and a base station device and a mobile wireless terminal used in the same system, which are capable of improving throughput and/or communication quality in the mobile wireless terminal when an HSDPA method is applied to W-CDMA communication.

According to a first aspect of the present invention, there is provided a mobile communication system including:
a mobile wireless terminal; and
a base station device;
wherein data is transmitted by an HSDPA method from the base station device to the mobile wireless terminal and wherein, the base station device transmits, prior to data transmission employing the HSDPA method, control data that gives advance notice of the data transmission employing the HSDPA method through an HS-SCCH to the mobile wireless terminal, and wherein the mobile wireless terminal, when receiving the control data from the base station device, increases power to be supplied for data transmission through an HS-DPCCH.

According to a second aspect of the present invention, there is provided a mobile communication system including:
a mobile wireless terminal; and
a base station device;
wherein data is transmitted by an HSDPA method from the base station device to the mobile wireless terminal and wherein, the base station device includes:
a control data producing unit to produce control data containing information to give advance notice of transmission of data to be made by the HSDPA method;
a control data transmitting unit to transmit, prior to transmission of the data to be received, the produced control data to the mobile wireless terminal; and
wherein, the mobile wireless terminal includes:
an advance notice information storing unit to store information showing an advance notice of a start of transmission of data to be made by the HSDPA method from the base station device;
a control data receiving unit to receive the control data through an HS-SCCH;
an advance notice information detecting unit to detect information to show the advance notice of the start of transmission of data contained in the received control data; and
a power supplying controlling unit to increase power to be supplied for data transmission through an HS-DPCCH when the advance notice of the start of transmission of data contained in the received control data is detected.

In the foregoing, a preferable mode is one wherein the control data producing unit produces control data containing one of empty patterns of a channelization code set for the HS-SCCH as information to give advance notice of the data transmission; and wherein the power supplying controlling unit increases power to be supplied for data transmission through the HS-DPCCH when one of empty patterns of the channelization code set for the HS-SCCH is detected by the advance notice information detecting unit.

According to a third aspect of the present invention, there is provided a base station device for data transmission to be made by an HSDPA method to a mobile wireless terminal, which transmits, prior to transmission of data to be made by the HSDPA method, control data that gives advance notice of the data transmission to be made by the HSDPA method through an HS-SCCH to the mobile wireless terminal.

According to a fourth aspect of the present invention, there is provided a base station device for data transmission to be made by an HSDPA method to a mobile wireless terminal, the base station including:
a control data producing unit to produce control data containing information to give advance notice of data transmission to be made by the HSDPA method; and
a control data transmitting unit to transmit, prior to transmission of data to be received, the produced control data to the mobile wireless terminal.

In the foregoing, a preferable mode is one wherein the control data producing unit produces control data containing one of empty patterns of a channelization code set for an HS-SCCH as information to give advance notice of the data transmission.

Also, a preferable mode is one wherein the control data producing unit produces control data containing any one of "1110000", "1110001", "1110010", "1110011", "1110100", "1110101", "1110110", and "1110111" serving as a channelization code set for the HS-SCCH.

According to a fifth aspect of the present invention, there is provided a mobile wireless terminal for receiving data by an HSDPA from a base station device, which increases power to be supplied for data transmission through an HS-DPCCH when receiving information showing an advance notice of a start of data transmission to be accomplished by using the HSDPA method from the base station device.

According to a sixth aspect of the present invention, there is provided a mobile wireless terminal for receiving data by using an HSDPA from a base station device, including:

an advance notice information storing unit to store information showing an advance notice of a start of data transmission to be made by the HSDPA method transmitted from the base station device;

a control data receiving unit to receive control data through an HS-SCCH;

an advance notice information detecting unit to detect information to show the advance notice of the start of data transmission contained in the received control data; and a power supplying controlling unit to increase power to be supplied for data transmission through an HS-DPCCH when the advance notice of the start of data transmission contained in the received control data is detected.

In the foregoing, a preferable mode is one wherein the advance notice information detecting unit detects empty patterns of a channelization code set for the HS-SCCH as the data transmission advance notice information.

Also, a preferable mode is one wherein the advance notice information detecting unit stores at least one of "1110000", "1110001", "1110010", "1110011", "1110100", "1110101", "1110110", and "1110111" serving as a channelization code set for the HS-SCCH as the data transmission advance notice information.

With the above configuration, when the HSDPA method is applied to the W-CDMA communication, it is made possible to improve throughput and/or communication quality in the mobile wireless terminal.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Embodiment

Figure 1:
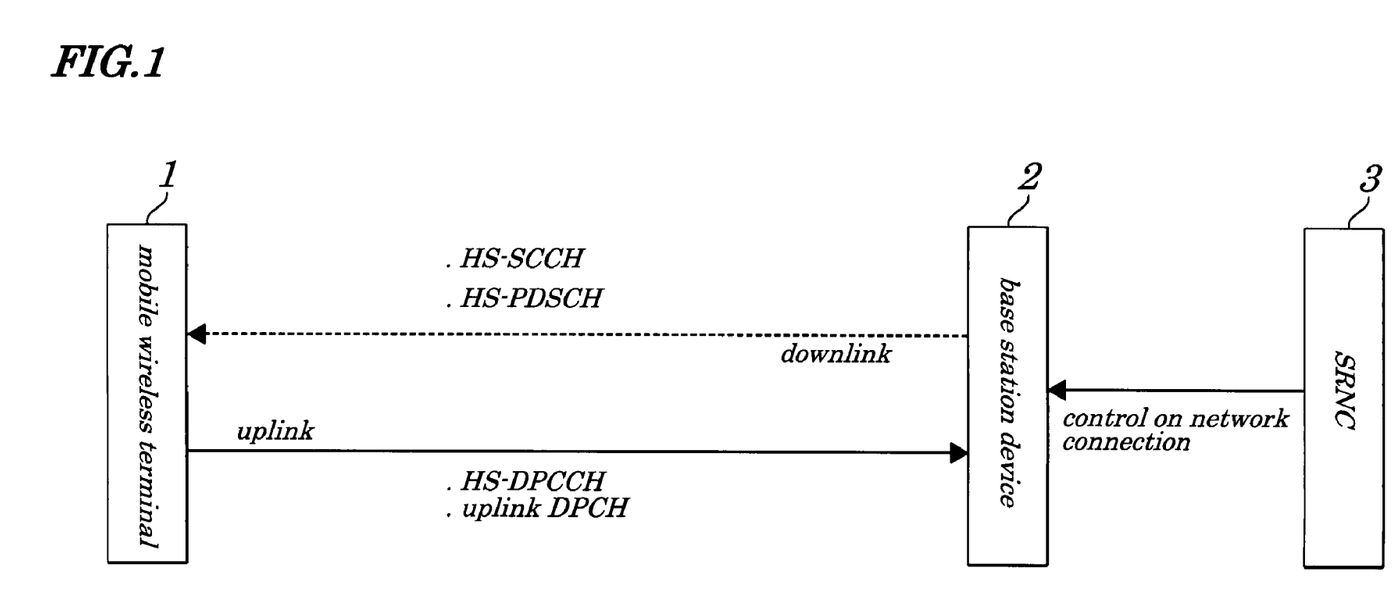
FIG. 1 is a diagram illustrating configurations of a mobile communication system according to an embodiment of the present invention.

FIG. 1 is a diagram illustrating configurations of a mobile communication system according to an embodiment of the present invention. As shown in FIG. 1, the mobile communication system includes a mobile wireless terminal 1, a base station device 2, an SRNC (Serving Radio Network Controller) 3. Though not shown in FIG. 1, the mobile communication system, like an ordinary mobile communication system, further has a switching center, a communication controlling device, an HLR (Home Location Register), and a like. Moreover, the number of components making up the mobile communication system is not limited to that shown in FIG. 1.

As shown in FIG. 1, in the mobile communication system, when communications are carried out by applying the HSDPA (High Speed Downlink Packet Access) method, the base station device 2 transmits data through an HS-SCCH (High Speed-Shared Control CHannel) and an HS-PDSCH (High Speed-Physical Downlink Shared CHannel) in a downlink to the mobile wireless terminal 1. The mobile wireless terminal 1, when receiving data transmitted through the HS-SCCH and HS-PDSCH from the base station device 2, transmits information about a state of having received data transmitted through the HS-PDSCH to the base station device 2 through the HS-DPCCH. Moreover, though other channels such as a downlink DPCH (Dedicated Physical CHannel) are not shown in FIG. 1, it is assumed that communication is carried out according the conventional W-CDMA (Wideband Code Division Multiple Access) method in practice.

Figure 2:
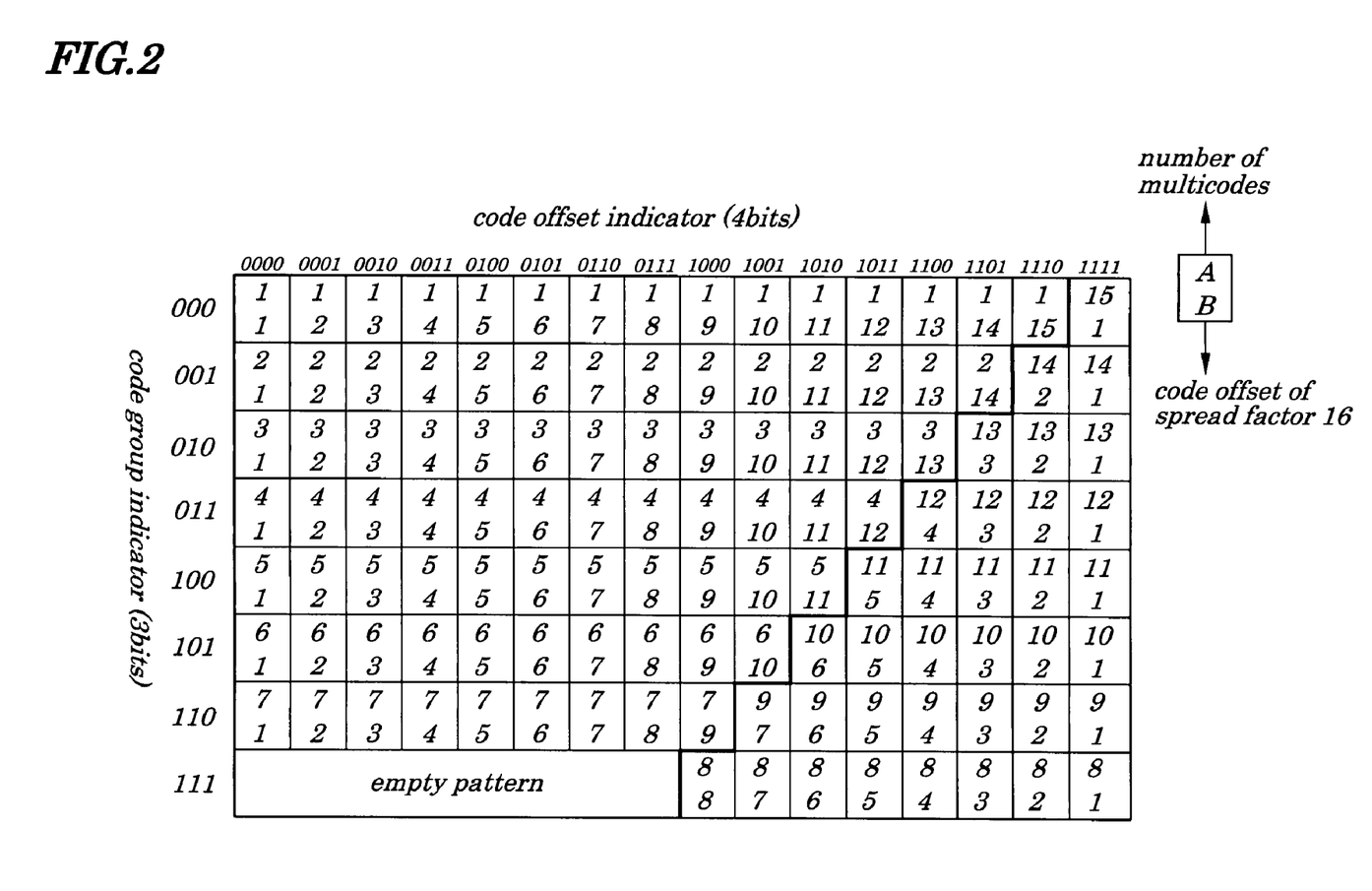
FIG. 2 is a diagram showing a table of a pattern of a channelization code set according to the embodiment of the present invention.

FIG. 2 is a diagram showing a table of patterns of a channelization code set according to the embodiment of the present invention. As shown in FIG. 2, in the present invention, with attention being given to existence of empty patterns in a parameter called a channelization code set, which is transmitted through the HS-SCCH, being expressed by seven bits, the empty patterns are made to play a new role as an advance notice indicating that the base station device 2 starts transmission through a downlink employed in the HSDPA method. In the embodiment, hereinafter, the parameter representing the advance notice is called a "warning". As shown in FIG. 2, in the channelization code set, eight patterns including "1110000", "1110001", "1110010", "1110011", "1110100", "1110101", "1110110", and "1110111" are the empty patterns which are not used as a channelization code.

Next, procedures (operation methods) using this warning are described below.

1. The base station device 2 transmits, several tens of milliseconds or more before packet data is transmitted through the downlink HS-PDSCH employed in the HSDPA, a warning parameter through the downlink HS-SCCH to the mobile wireless terminal 1.

2. The mobile wireless terminal 1, when receiving the warning parameter, adds an assumed value of power to be used in the HS-DPCCH to an expected transmission power value to be used for determining whether information about whether a TFC (Transport Format Combination) of the downlink DPCH can be used or not.

The above procedure 1 enables the mobile wireless terminal 1 to know, in advance, timing with which receiving of data transmitted through the downlink HS-PDSCH is started, and the above procedure 2 enables timing with which power to be used in the downlink HS-DPCCH is added to an estimated transmission power value to be more speeded up compared with the conventional case. This enables the mobile wireless terminal 1 to secure supply of power to be assigned to the uplink HS-DPCCH from a start time of transmission of HS-DPCCH data and, therefore, communication quality of the uplink DPCH and the HS-DPCCH from a start time of data transmission can be improved.

Figure 3:
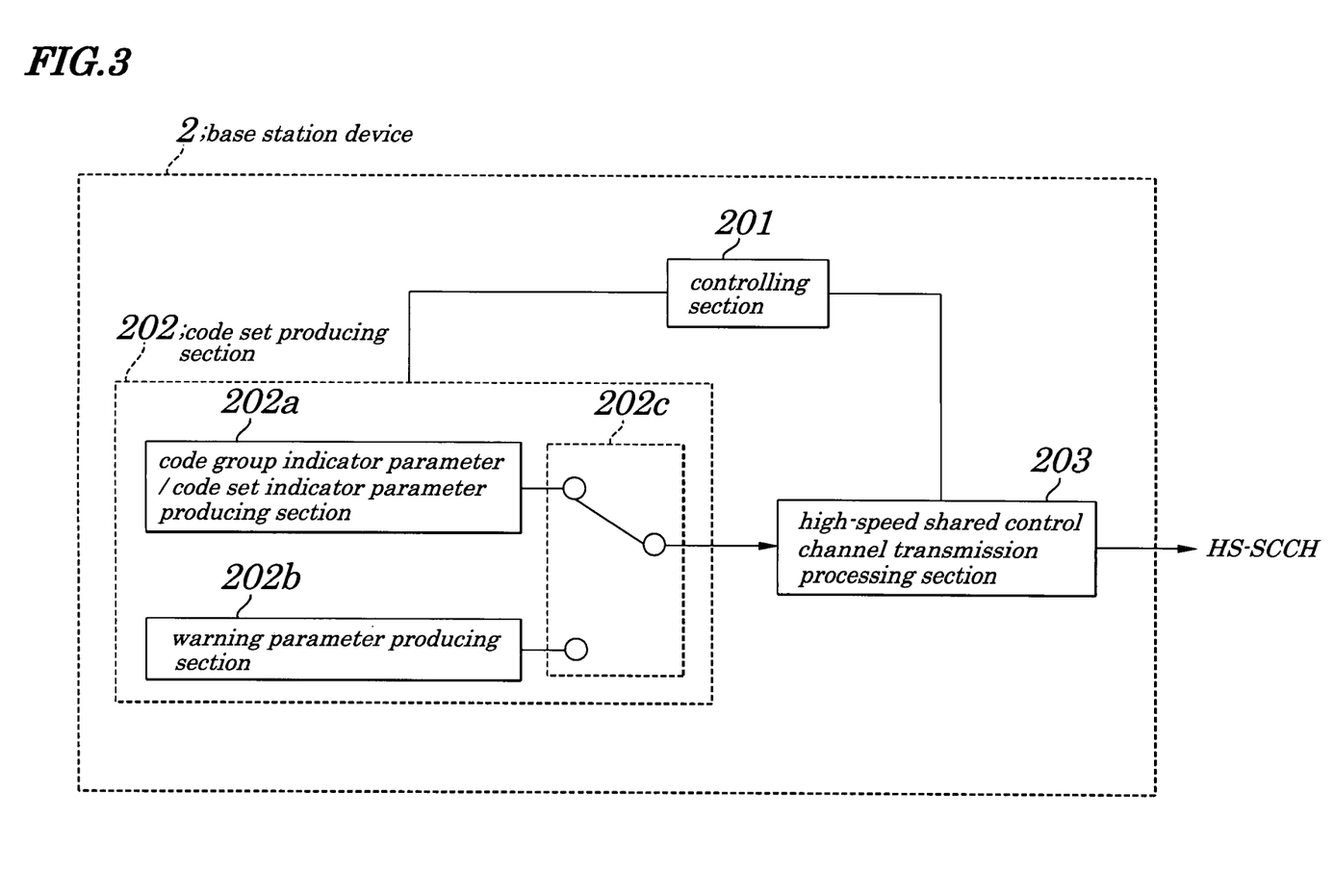
FIG. 3 is a diagram showing configurations of a base station device according to the embodiment of the present invention.

FIG. 3 is a diagram showing configurations of the base station device 2 according to the embodiment of the present invention. The configurations and operations of the base station device 2 are described below by referring to FIG. 3.

As shown in FIG. 3, the base station device 2 includes a controlling section 201, a code set producing section 202, and a high-speed shared control channel transmission processing section 203.

The controlling section 201 is a section to control the entire base station device 2 and, for example, may be made up of a CPU (Central Processing Unit) (not shown) and a program storing unit (not shown) to store a program which is read out by the CPU to perform necessary processing.

The code set producing section 202 produces, according to a control signal fed from the controlling section 201, an original channelization code set (channelization code set from which the warning is excluded) or a channelization code set which indicates the warning and outputs the produced code set to the high-speed shared control channel transmission processing section 203. Also, the code set producing section 202 has a code group indicator parameter/code set indicator parameter producing section 202a, a warning parameter producing section 202b, and a code set selecting section 202c. The code group indicator parameter/code set indicator parameter producing section 202a produces original channelization code sets. The warning parameter producing section 202b produces a code set that indicates the warning. The code set selecting section 202c selects either of the original code set or the warning code set, according to the control signal fed from the controlling section 201.

Moreover, the base station device 2 may operate the processing of production, selection and output of a code set by using the CPU of the controlling section 201, without mounting the code set producing section 202.

The high-speed shared control channel transmission processing section 203 produces an HSDPA packet (control data) containing a channelization code set produced by the code set producing section 202 and transmits the packet to the mobile wireless terminal 1 through the downlink HS-SCCH.

Figure 4:
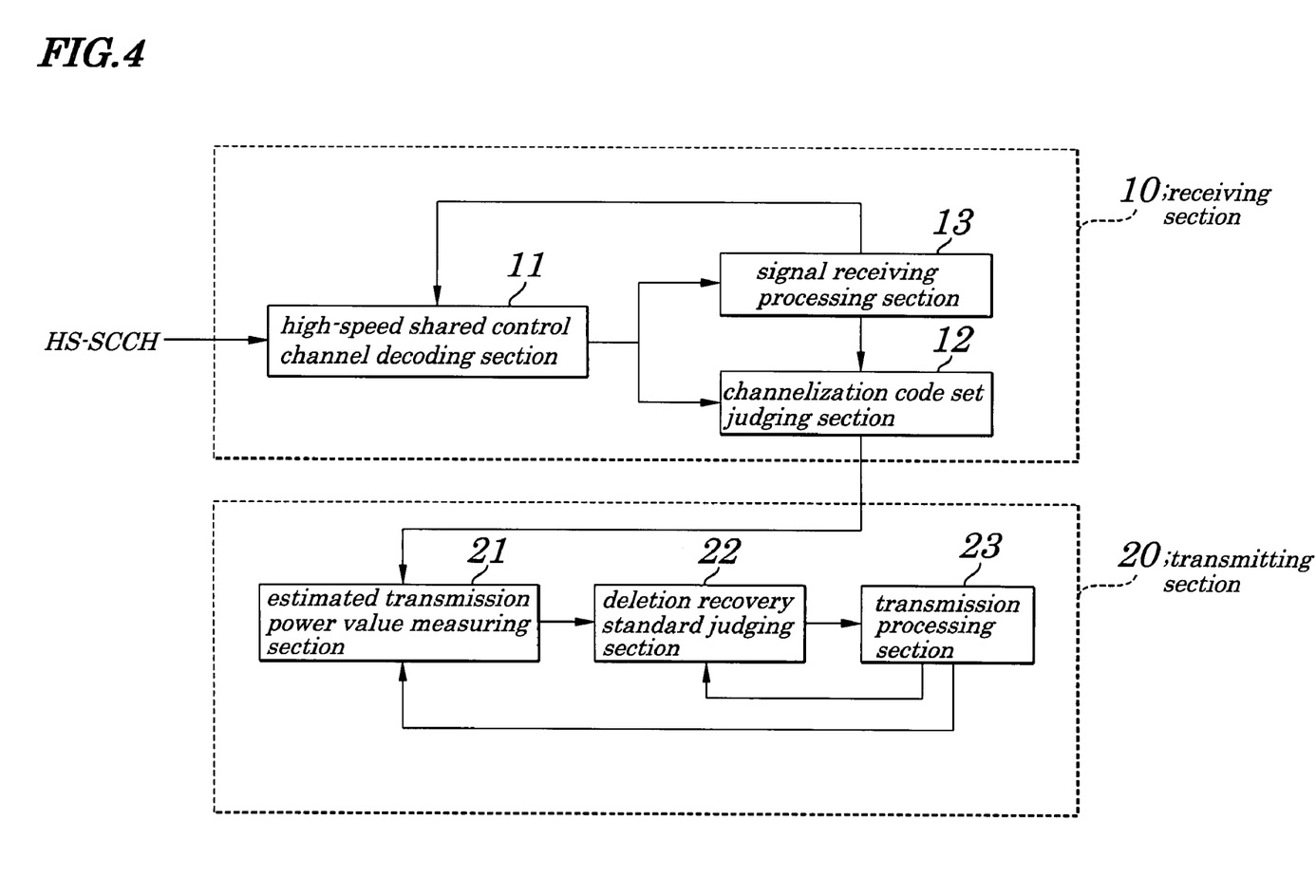
FIG. 4 is a diagram showing configurations of a mobile wireless terminal according to the embodiment of the present invention.

FIG. 4 is a diagram showing configurations of the mobile wireless terminal 1 according to the embodiment of the present invention. The configurations and operations of the mobile wireless terminal 1 are described below by referring to FIG. 4.

As shown in FIG. 4, the mobile wireless terminal 1 is made up of a receiving section 10 and a transmitting section 20. The receiving section 10 performs processing of receiving data from the base station device 2 (FIG. 1). The transmitting section 20 performs processing of transmitting data to the base station device 2.

The receiving section 10 has a high-speed shared control channel decoding section 11, a channelization code set judging section 12, and a signal receiving processing section 13.

The high-speed shared control channel decoding section 11 decodes data input through the downlink HS-SCCH. The channelization code set judging section 12 holds, in advance, at least one of the eight empty patterns described above as a code set to indicate the warning. The channelization code set judging section 12 receives an input of a channelization code set decoded by the high-speed shared control channel decoding section 11 and compares the input code set with a code set being held, and judges whether a pattern indicates an original channelization code set or a warning. The signal receiving processing section 13 controls the high-speed shared control channel decoding section 11 and the channelization code set judging section 12. The signal receiving processing section 13 receives an input of the channelization code set from the high-speed shared control channel decoding section 11 and performs receiving processing.

The transmitting section 20 has an estimated transmission power value measuring section 21, a deletion recovery standard judging section 22, and a transmission processing section 23. The estimated transmission power value measuring section 21 measures an estimated transmission power value to be used as a standard for judging whether the TFC can be used. The deletion recovery standard judging section 22 judges whether the TFC can be used according to the input of the estimated transmission power value from the estimated transmission power value measuring section 21. The transmission processing section 23 controls the estimated transmission power value measuring section 21 and the deletion recovery standard judging section 22. Moreover, the transmission processing section 23 receives an input of a deleted and recovered TFC from the deletion recovery standard judging section 22, and performs transmmiting processing.

In one of examples according to the embodiment, a warning parameter is assigned to an empty pattern whose channelization code set is expressed by "1110000", out of the empty patterns for the channelization code set shown in FIG. 2. In FIG. 2, a meaning of each pattern of the channelization code set expressed by seven bits is shown. Out of seven bits making up the channelization code set, the first three bits represent a code group indicator being a group of the number of multicodes to be used by the HD-PDSCH. The last four bits making up the seven bits represent a code offset indicator to indicate which channelization code is used by the HS-PDSCH.

Figure 5:
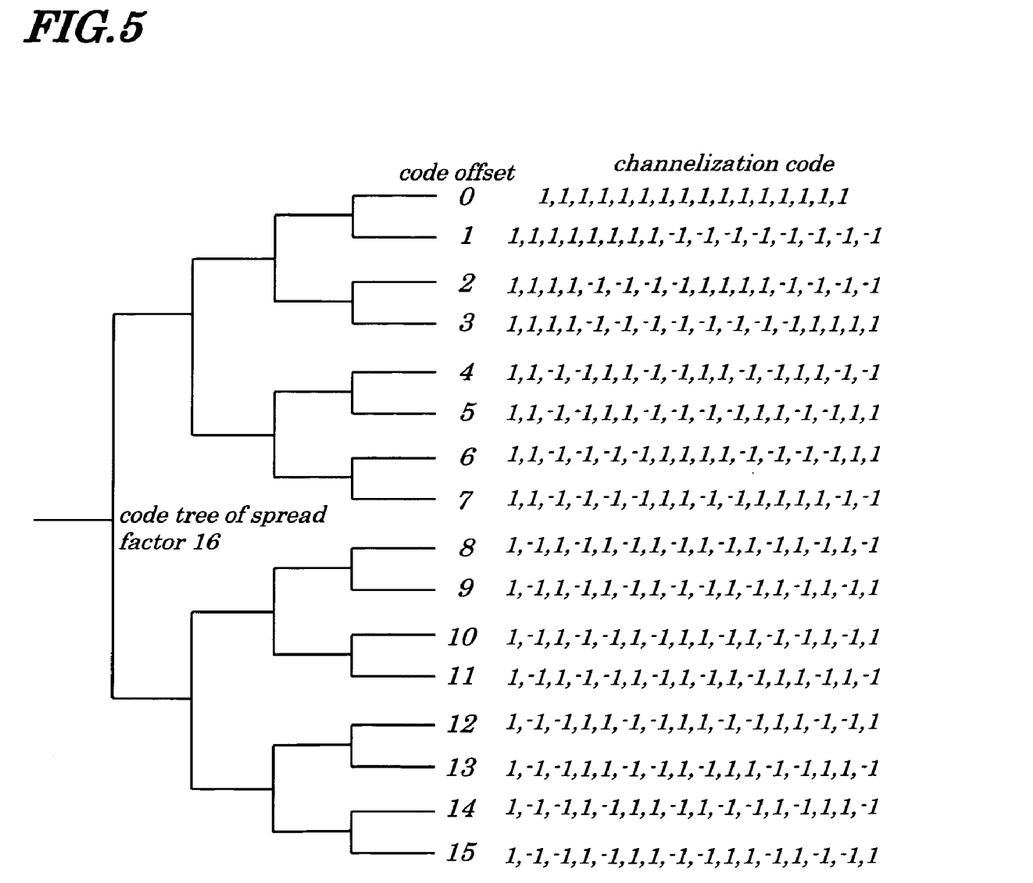
FIG. 5 is a diagram showing a relation between a channelization code and code offset according to the embodiment of the present invention.

Since a spread factor of the HS-PDSCH is 16, sixteen kinds of channelization codes exist and FIG. 5 shows a relation between the channelization code and a code offset. When a plurality of channelization codes such as multicodes is used, a channelization code having a larger code offset is used, in order, from the channelization code shown by the code offset.

The estimated transmission power value measuring section 21, basically according to an instruction for operation fed from the transmission processing section 23, outputs an estimated power value for a physical channel in the uplink to the deletion recovery standard judging section 22. It operates independently of operations of the embodiment described below. For example, the transmission processing section 23 outputs an instruction for outputting an estimated power value for every number frame, (for example, one frame) to the estimated transmission power value measuring section 21 which then performs the operation of outputting the estimated power value every time the output instruction is input. Moreover, an interval during which the instruction for outputting the estimated power value may be adjusted, for example, by the base station device 2.

Figure 6:
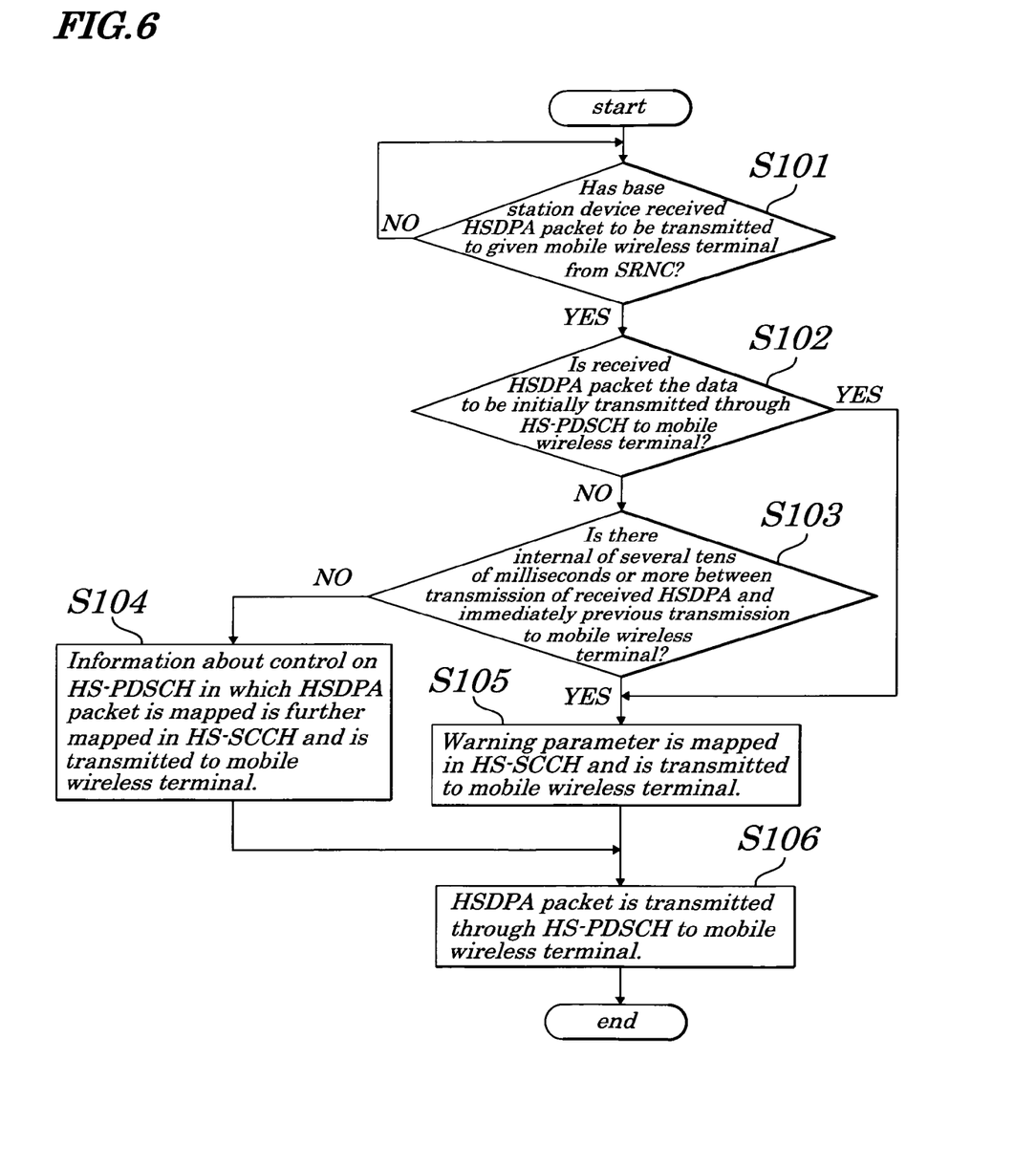
FIG. 6 is a flowchart showing a flow of operations performed by the base station device according to the embodiment of the present invention.

FIG. 6 is a flowchart showing a flow of operations performed by the base station device 2 according to the embodiment of the present invention. Operations of data transmission through the HS-SCCH by the base station device 2 according to the embodiment of the present invention are described by referring to FIG. 6.

First, the controlling section 201 judges whether or not the base station device 2 has received an HSDPA packet to be transmitted to a given mobile wireless terminal 1 from the SRNC 3 (Step S101). When it is judged that the HSDPA packet has not been received from the SRNC 3 (NO in Step S101), processing in Step S101 is repeated.

If it is judged that the HSDPA packet has been received from the SRNC 3 (YES in Step S101), the controlling section 201 judges whether the received HSDPA packet is data to be initially transmitted through the HS-PDSCH to the mobile wireless terminal 1, that is, whether or not the received HSDPA packet indicates a start of communication of data to be transmitted according to the HSDPA method to the mobile wireless terminal 1 (Step S102).

If it is judged that the received HSDPA packet does not indicate a start of communication of data to be transmitted according to the HSDPA method to the mobile wireless terminal 1 (NO in Step S102), whether or not there exists an interval of several tens of milliseconds or more between the transmission of the received HSDPA to the mobile wireless terminal 1 and immediately previous transmission of the HSDPA packet to the mobile wireless terminal 1 is judged (Step S103).

If it is judged that the received HSDPA packet is transmitted in less than several tens of milliseconds after immediately previous transmission (NO in Step S102), the code set producing section 202 produces data, which contains an original channelization code set, to be transmitted through the HS-SCCH as control information on data, which is indicated by the HSDPA packet, to be transmitted through the HS-PDSCH. The high-speed shared control channel transmission processing section 203 transmits data, which contains its original channelization code set, to be transmitted through the HS-SCCH to the mobile wireless terminal 1 (Step S104). After data to be transmitted through the HS-SCCH has been sent, the base station device 2 transmits the HSDPA packet received from the SRNC 3 to the mobile wireless terminal 1 through the HS-PDSCH (Step S106).

On the other hand, if the received HSDPA packet is judged to indicate a start of communication of data to be transmitted according to the HSDPA method to the mobile wireless terminal 1 (YES in Step S102) or the received HSDPA packet is judged to be transmitted at an interval of several tens of milliseconds or more between the transmission of the received HSDPA packet to the mobile wireless terminal 1 and immediately previous transmission of the HSDPA packet to the mobile wireless terminal 1 (YES in Step S103), the code set producing section 202 produces data, which includes a channelization code set used to indicate a warning, to be transmitted through the HS-SCCH as information of control on data to be transmitted through the HS-PDSCH indicated by the HSDPA packet.

The high-speed shared control channel transmission processing section 203 transmits data, which includes a channelization code set used to indicate a warning, to be transmitted through the HS-SCCH to the mobile wireless terminal 1 (Step S105). After that, similarly, the base station device 2 transmits the HSDPA packet received from the SRNC 3 to the mobile wireless terminal 1 through the HS-PDSCH (Step S106).

Figure 7:
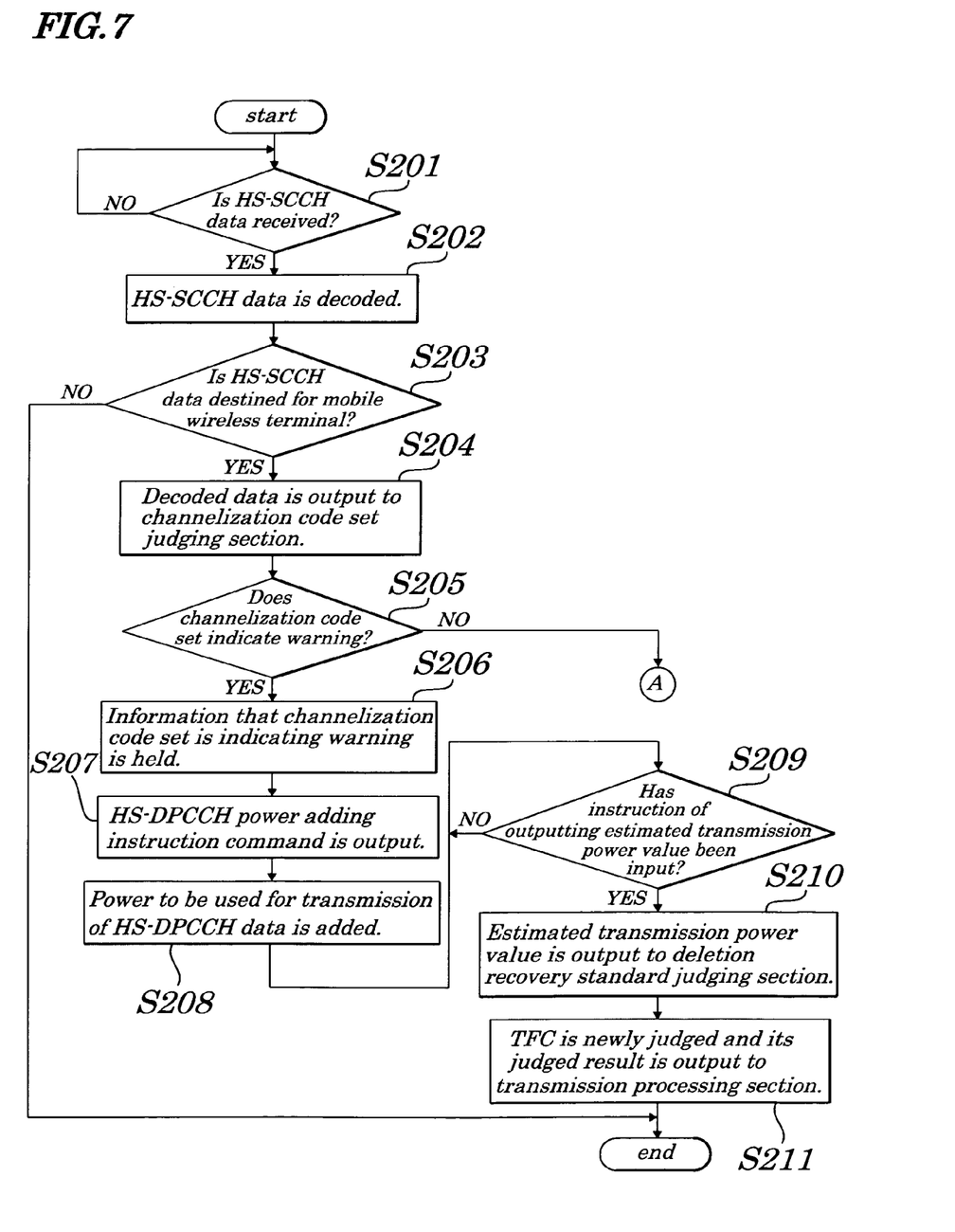
FIG. 7 is a flowchart showing a flow of operations performed by the mobile wireless terminal according to the embodiment of the present invention.
Figure 8:
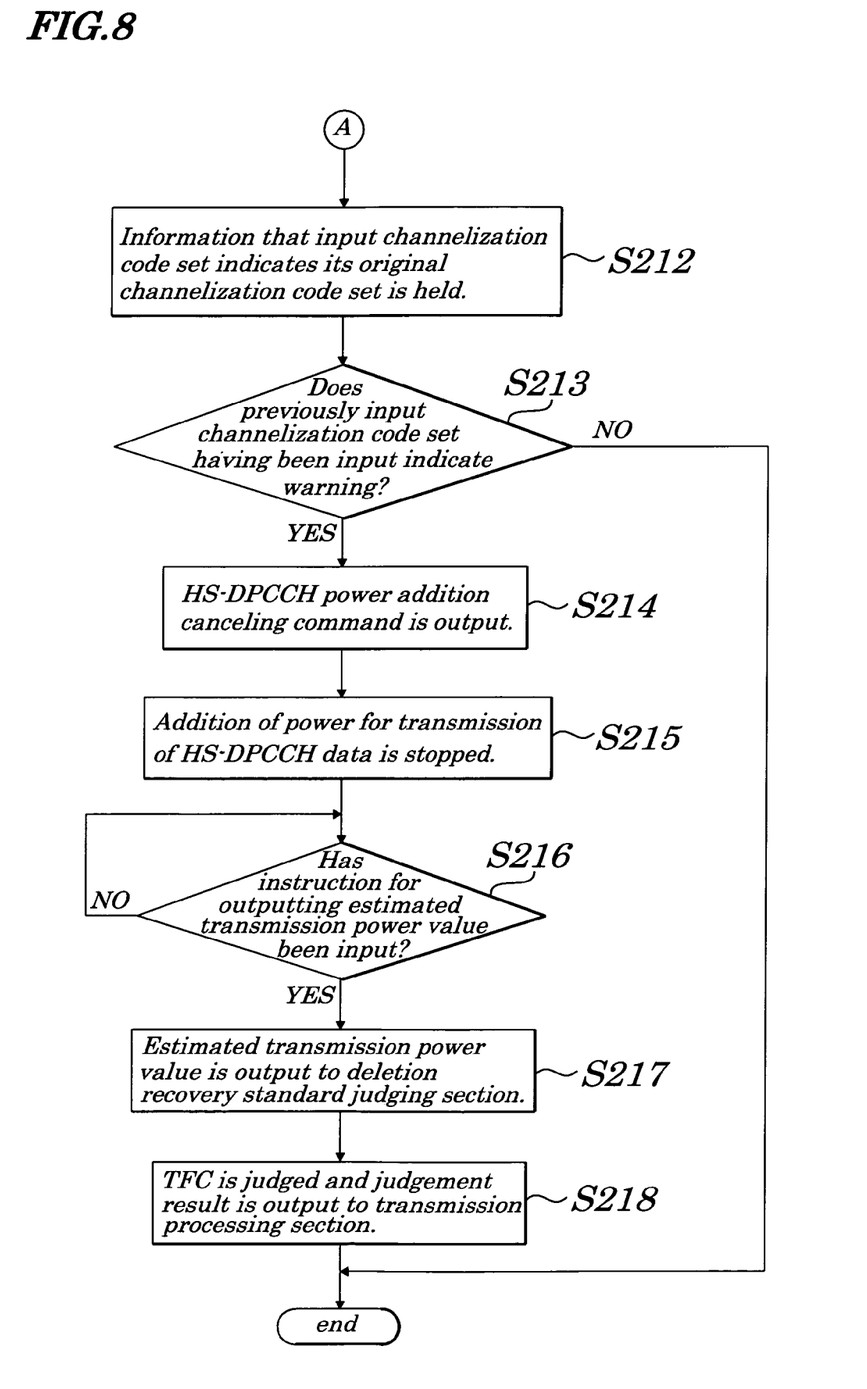
FIG. 8 is also a flowchart showing a flow of operations performed by the mobile wireless terminal according to the embodiment of the present invention.

FIGS. 7 and 8 are flowcharts showing flows of operations performed by the mobile wireless terminal 1 according to the embodiment of the present invention. FIG. 9 is a diagram showing timing of receiving data to be transmitted through the HS-SCCH and HS-PDSCH from the base station device 2 and timing of transmitting data to be transmitted through the HS-DPCCH to the base station device 2.

Data transmission operations of the mobile wireless terminal 1 of the embodiment are described below by referring to FIGS. 7, 8, and 9.

In FIG. 9, the numeral (1) shows data (3 slots) to be received through the HS-SCCH by the mobile wireless terminal 1. The numeral (2) shows data (3 slots) to be transmitted through the HS-PDSCH which is controlled by the data transmitted through the HS-SCCH. As shown in FIG. 9, the base station device 2 starts to receive the HS-PDSCH data indicated by the numeral (2) two slots after the start of receiving the HS-SCCH data. The numeral (3) shows HS-DPCCH data (3 slots) to be transmitted in a manner to correspond to the received HS-PDSCH data (2). As shown in FIG. 9, the base station device 2 starts to transmit the HS-DPCCH data (3) about 7.5 slots after the start of receiving the HS-PDSCH data (2).

As shown in FIG. 7, when the receiving section 10 has received the HS-SCCH data from the base station device 2 (YES in Step S201), the high-speed shared control channel decoding section 11 decodes the HS-SCCH data to be input (Step S202).

Next, the high-speed shared control channel decoding section 11 judges whether or not the decoded HS-SCCH data is destined for the mobile wireless terminal 1 (Step S203). If the decoded HS-SCCH data is judged as not being destined for the mobile wireless terminal 1 (NO in Step S203), the mobile wireless terminal 1 terminates operations.

If the decoded HS-SCCH data is judged as being destined for the mobile wireless terminal 1 (YES in Step S203), the high-speed shared control channel decoding section 11 outputs decoded data (channelization code set) to the channelization code set judging section 12 (Step S204).

Next, the channelization code set judging section 12 judges whether the channelization code set input from the high-speed shared control channel decoding section 11 indicates a warning (Step S205).

If the channelization code set is judged to have indicated a warning (YES in Step S205), the channelization code set judging section 12 holds information that the channelization code set is indicating the warning (Step S206). Next, the channelization code set judging section 12 outputs an HS- DPCCH power adding instruction command to the estimated transmission power value measuring section 21 (Step 207).

The estimated transmission power value measuring section 21, when receiving an input of the HS-DPCCH power adding instruction command, from the timing with which an output instruction of an estimated power value from the transmission processing section 23 is input, power to be used for transmission of the assumed HS-DPCCH data is added to an actual estimated transmission power value (Step S208).

Then, the estimated transmission power value measuring section 21 judges whether or not an instruction for outputting an estimated transmission power value is input to the estimated transmission power value measuring section 21 itself (Step S209). If the instruction for outputting an estimated transmission power value is judged not to have been input (NO in Step S209) to the estimated transmission power value measuring section 21 itself, the estimated transmission power value measuring section 21 repeats processing in Step S209.

If the instruction for outputting an estimated transmission power value is judged to have been input (YES in Step S209), the estimated transmission power value measuring section 21, with timing of operations instructed by the transmission processing section 23, outputs the estimated transmission power value to the deletion recovery standard judging section 22 (Step S210). Moreover, the estimated transmission power value measuring section 21 continues to add the assumed HS-DPCCH power to an actual estimated transmission power value until the estimated transmission power value measuring section 21 receives an input of the HS-DPCCH power addition canceling instruction command to cancel the HS-DPCCH power addition instruction command.

The deletion recovery standard judging section 22, when having received an input of the estimated transmission power value from the estimated transmission power value measuring section 21, identifies a TFC, out of the TFCs in the uplink DPCH, to be judged newly as being unable to be used or a TFC having been unable to be used until then is newly judged as being able to be used and outputs information of the TFC having been newly judged to the transmission processing section 23 (Step S211). Now, the mobile wireless terminal 1 terminates operations.

If the channelization code set is judged as not indicating a warning, that is, the channelization code set is judged as its original channelization code set (NO in Step S205), the channelization code set judging section 12 holds information that the channelization code set indicates its original channelization code set (Step S212) (FIG. 8).

Next, the channelization code set judging section 12 makes a reference to information being held by the channelization code set judging section 12 and judges whether or not the channelization code set that has been input to the channelization code set judging section 12 indicates a warning (Step S213). When the channelization code set judging section 12 judges the channelization code set having been input to the channelization code set as being the original channelization code set (NO in Step S213), the mobile wireless terminal 1 terminates operations.

The channelization code set judging section 12, when judging the channelization code set input thereto at a previous time as indicating a warning (YES in Step S213), outputs an HS-DPCCH power addition canceling command to the estimated transmission power value measuring section 21 (Step S214).

The estimated transmission power value measuring section 21, when receiving an input of the HS-DPCCH power addition canceling command, from timing at which an instruction of outputting an estimated power value is input from the transmission processing section 23, stops addition of assumed power for transmission of the HS-DPCCH data (Step S215).

Then, the estimated transmission power value measuring section 21 judges whether or not an instruction for outputting an estimated transmission power value has been input from the transmission processing section 23 to the estimated transmission power value measuring section 21 itself (Step S216). The estimated transmission power value measuring section 21, when judging that an instruction for outputting an estimated transmission power value has not been input (NO in Step S216), repeats processing in Step S216.

If the instruction for outputting the estimated transmission power value is judged to have been input (YES in Step S216), the estimated transmission power value measuring section 21, with timing of operations instructed by the transmission processing section 23, outputs an actual estimated transmission power value to the deletion recovery standard judging section 22 (Step S217).

The deletion recovery standard judging section 22, when having received an input of the estimated transmission power value from the estimated transmission power value measuring section 21, identifies a TFC, out of the TFCs in the uplink DPCH, to be judged newly as being unable to be used or a TFC having been unable to be used until then is newly judged as being able to be used and outputs information of the TFC having been newly judged to the transmission processing section 23 (Step S218). Now, the mobile wireless terminal 1 terminates operations. Moreover, in the present invention, the method for adding assumed power for the HS-DPCCH to the estimated power value is not limited to those described in the above embodiment.

As described above, according to the embodiment of the present invention, the base station device 2 transmits an empty pattern of a channelization code set for the HS-SCCH, which is used as an advance notice of data transmission through a downlink employed in the HSDPA method, to the mobile wireless terminal 1. The mobile wireless terminal 1, when having received the advance notice of data transmission through the downlink employed in the HSDPA method, adds assumed power for transmission of the HS-DPCCH data to the estimated transmission power value to be used for judgement as to whether a TFC of the DPCH is usable or not. As a result, since the mobile wireless terminal 1 can obtain, in advance, power to be used for the HS-DPCCH, the base station device 2 can reliably decode uplink DPCH data and uplink HS-DPCCH data being transmitted from the mobile wireless terminal 1 over a period of several tens of milliseconds or more following a first receipt of packet data in the HSDPA, thus enabling the conventional problem to be solved and throughput of the downlink employed in the HSDPA method to be improved.

Moreover, alternatively, each processing performed in the above embodiment may be performed by computer programs installed in the mobile wireless terminal 1, base station device 2, or SRNC 3. Also, the computer programs may be stored in an optical storage medium, magnetic storage medium, optical magnetic medium, or storage medium such as semiconductors or a like, or may be downloaded from outside devices being connected to a specified network.

It is apparent that the present invention is not limited to the above embodiments but may be changed and modified without departing from the scope and spirit of the invention.

What is claimed is:

1. A mobile communication system comprising:
a mobile wireless terminal; and
a base station device;
wherein data is transmitted by an HSDPA (High Speed Downlink Packet Access) method from said base station device to said mobile wireless terminal and wherein, said base station device transmits, prior to data transmission employing said HSDPA method, control data that gives advance notice of the data transmission employing said HSDPA method through an HS-SCCH (High Speed-Shared Control CHannel) to said mobile wireless terminal, and wherein said mobile wireless terminal, when receiving said control data from said base station device, increases power to be supplied for data transmission through an HS-DPCCH (High Speed—Dedicated Physical Control CHannel),
wherein said control data contains one of empty patterns of a channelization code set for an HS-SCCH as information to give the advance notice of the data transmission.

2. A mobile communication system comprising:
a mobile wireless terminal; and
a base station device;
wherein data is transmitted by an HSDPA (High Speed Downlink Packet Access) method from said base station device to said mobile wireless terminal and wherein, said base station device comprises:
a control data producing unit to produce control data containing information to give advance notice of transmission of data to be made by said HSDPA method;
a control data transmitting unit to transmit, prior to the transmission of said data to be received, the produced control data to said mobile wireless terminal; and
wherein, said
mobile wireless terminal comprises:
an advance notice information storing unit to store information showing an advance notice of a start of the transmission of data to be made by said HSDPA method from said base station device;
a control data receiving unit to receive said control data through an HS-SCCH (High Speed-Shared Control CHannel);
an advance notice information detecting unit to detect information to show the advance notice of the start of the transmission of data contained in the received control data; and
a power supplying controlling unit to increase power to be supplied for data transmission through an HS-DPCCH (High Speed- Dedicated Physical Control CHannel) when the advance notice of the start of the transmission of data contained in the received control data is detected,
wherein said control data producing unit produces the control data containing one of empty patterns of a channelization code set for said HS-SCCH as information to give the advance notice of the data transmission.

3. The mobile communication system according to claim 2, wherein said power supplying controlling unit increases power to be supplied for the data transmission through said HS-DPCCH when one of the empty patterns of said channelization code set for said HS-SCCH is detected by the advance notice information detecting unit.

4. A base station device for data transmission to be made by an HSDPA (High Speed Downlink Packet Access) method to a mobile wireless terminal, which transmits, prior to transmission of data to be made by said HSDPA method, control data that gives advance notice of the data transmission to be made by said HSDPA method through an HS-SCCH (High Speed—Shared Control CHannel) to said mobile wireless terminals,
wherein said control data contains one of empty patterns of a channelization code set for an HS-SCCH as information to give the advance notice of the data transmission.

5. The base station device according to claim 4, wherein said control data producing unit produces the control data containing any one of "1110000", "1110001", "1110010", "1110011", "1110100", "1110101", "1110110", and "1110111" serving as the channelization code set for said HS-SCCH.

6. The base station device according to claim 4, wherein the control data that gives advance notice of the data transmission to be made by said HSDPA method comprises advance notice of a start of the transmission of data to be made by said HSDPA method.

7. A base station device for data transmission to be made by an HSDPA (High Speed Downlink Packet Access) method to a mobile wireless terminal, said base station comprising:
a control data producing unit to produce control data containing information to give advance notice of the data transmission to be made by said HSDPA method; and
a control data transmitting unit to transmit, prior to the transmission of data to be received, the produced control data to said mobile wireless terminals,
wherein said control data producing unit produces the control data containing one of empty patterns of a channelization code set for an HS-SCCH (High Speed—Shared Control CHannel) as information to give the advance notice of the data transmission.

8. The base station device according to claim 7, wherein the control data containing information to give advance notice of the data transmission to be made by said HSDPA method comprises advance notice of a start of the transmission of data to be made by said HSDPA method.

9. A mobile wireless terminal for receiving data by an HSDPA (High Speed Downlink Packet Access) from a base station device, which increases power to be supplied for data transmission through an HS-DPCCH (High Speed—Dedicated Physical Control CHannel) when receiving information showing an advance notice of a start of data transmission to be made by said HSDPA method from said base station device wherein the information showing advance notice is empty patterns of channelization code set for HS-SCCH as data transmission advance notice information.

10. The mobile wireless terminal according to claim 9, wherein the advance notice information detecting unit stores at least one of "1110000", "1110001", "1110010", "1110011", "1110100", "1110101", "1110110", and "1110111" serving as a channelization code set for said HS-SCCH as the data transmission advance notice information.

11. A mobile wireless terminal for receiving data by using an HSDPA (High Speed Downlink Packet Access) from a base station device, comprising:
an advance notice information storing unit to store information showing an advance notice of a start of data transmission to be made by said HSDPA method transmitted from said base station device;
a control data receiving unit to receive control data through an HS-SCCH (High Speed-Shared Control CHannel);
an advance notice information detecting unit to detect the information to show the advance notice of the start of the data transmission contained in the received control data; and
a power supplying controlling unit to increase power to be supplied for data transmission through an HS-DPCCH (High Speed—Dedicated Physical Control) when the advance notice of the start of the data transmission contained in the received control data is detected,
wherein the advance notice information detecting unit detects empty patterns of the channelization code set for said HS-SCCH as data transmission advance notice information.

12. A mobile communication system comprising:
a mobile wireless terminal; and
a base station device;
wherein data is transmitted by an HSDPA (High Speed Downlink Packet Access) method from said base station device to said mobile wireless terminal and wherein, said base station device comprises:
a control data producing means to produce control data containing information to give advance notice of transmission of data to be made by said HSDPA method;
a control data transmitting means to transmit, prior to the transmission of said data to be received, the produced control data to said mobile wireless terminal; and
wherein, said mobile wireless terminal comprises:
an advance notice information storing means to store information showing an advance notice of a start of the transmission of data to be made by said HSDPA method from said base station device;
a control data receiving means to receive said control data through an HS-SCCH (High Speed-Shared Control CHannel);
an advance notice information detecting means to detect information to show the advance notice of the start of the transmission of data contained in the received control data; and
a power supplying controlling means to increase power to be supplied for data transmission through an HS-DPCCH (High Speed—Dedicated Physical Control CHannel) when the advance notice of the start of the transmission of data contained in the received control data is detected,
wherein said control data producing means produces the control data containing one of empty patterns of a channelization code set for an HS-SCCH as information to give the advance notice of the data transmission.

13. The mobile communication system according to claim 12, wherein said control data producing means produces the control data containing one of empty patterns of a channelization code set for said HS-SCCH as information to give the advance notice of the data transmission and wherein said power supplying controlling means increases power to be supplied for the data transmission through said HS-DPCCH when one of the empty patterns of said channelization code set for said HS-SCCH is detected by the advance notice information detecting means.

14. The base station device according to claim 13, wherein said control data producing means produces the control data containing any one of "1110000", "1110001", "1110010", "1110011", "1110100", "1110101", "1110110", and "1110111" serving as the channelization code set for said HS-SCCH.

15. A base station device for data transmission to be made by an HSDPA (High Speed Downlink Packet Access) method to a mobile wireless terminal, said base station comprising:
a control data producing means to produce control data containing information to give advance notice of the data transmission to be made by said HSDPA method; and
a control data transmitting means to transmit, prior to the transmission of data to be received, the produced control data to said mobile wireless terminal,
wherein said control data producing means produces the control data containing one of empty patterns of a channelization code set for an HS-SCCH (High Speed—Shared Control CHannel) as information to give the advance notice of the data transmission.

16. The base station device according to claim 15, wherein the control data containing information to give advance notice of the data transmission to be made by said HSDPA method comprises advance notice of a start of the transmission of data to be made by said HSDPA method.

17. A mobile wireless terminal for receiving data by using an HSDPA (High Speed Downlink Packet Access) from a base station device, comprising:
an advance notice information storing means to store information showing an advance notice of a start of data transmission to be made by said HSDPA method transmitted from said base station device;
a control data receiving means to receive control data through an HS-SCCH (High Speed-Shared Control CHannel);
an advance notice information detecting means to detect the information to show the advance notice of the start of the data transmission contained in the received control data; and
a power supplying controlling means to increase power to be supplied for data transmission through an HS-DPCCH (High Speed—Dedicated Physical Control) when the advance notice of the start of the data transmission contained in the received control data is detected,
wherein the advance notice information detecting means detects empty patterns of the channelization code set for said HS-SCCH as data transmission advance notice information.

18. The mobile wireless terminal according to claim 17, wherein the advance notice information detecting means stores at least one of "1110000", "1110001", "1110010", "1110011", "1110100", "1110101", "1110110", and "1110111" serving as a channelization code set for said HS-SCCH as the data transmission advance notice information.

* * * * *